Nov. 5, 1968  R. H. BLACKFORD  3,409,038
LAMINATED MAGNETIC RUBBER VALVE
Filed April 26, 1966  3 Sheets-Sheet 1

INVENTOR.
Raymond H. Blackford

BY Paul & Paul
ATTORNEYS

Nov. 5, 1968  R. H. BLACKFORD  3,409,038
LAMINATED MAGNETIC RUBBER VALVE
Filed April 26, 1966  3 Sheets-Sheet 2
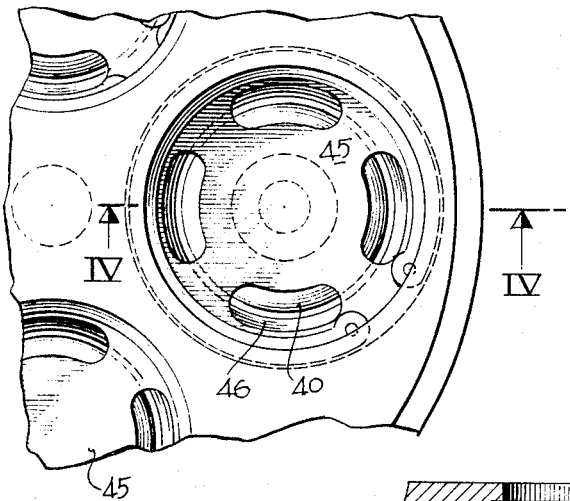
FIG.3
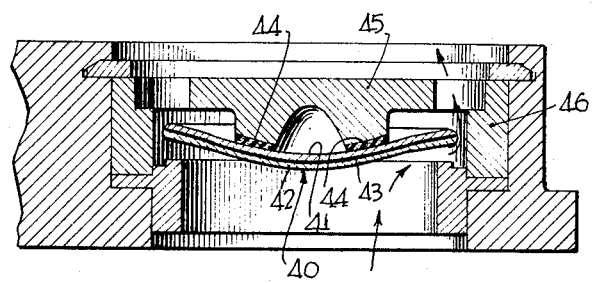
FIG.4
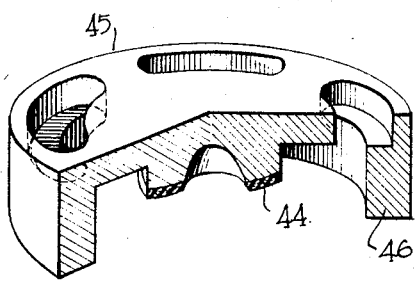
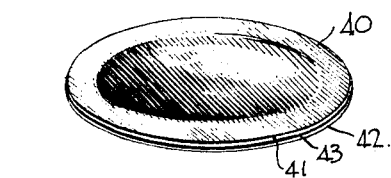
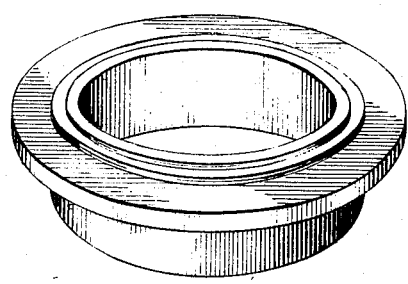
FIG.5
INVENTOR.
Raymond H. Blackford.
BY
Paul & Paul
ATTORNEYS Nov. 5, 1968   R. H. BLACKFORD   3,409,038
LAMINATED MAGNETIC RUBBER VALVE
Filed April 26, 1966   3 Sheets-Sheet 3
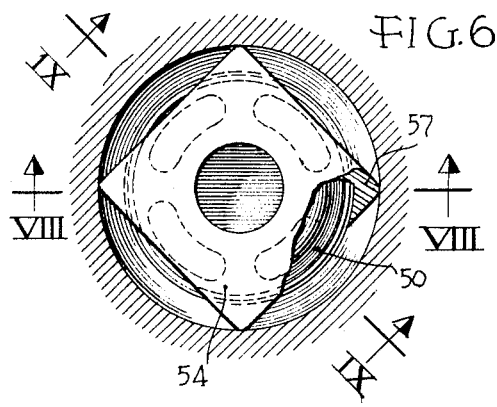
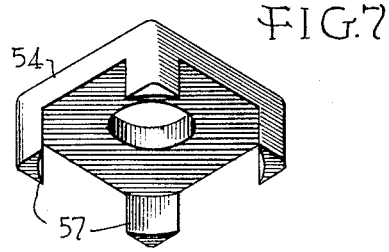
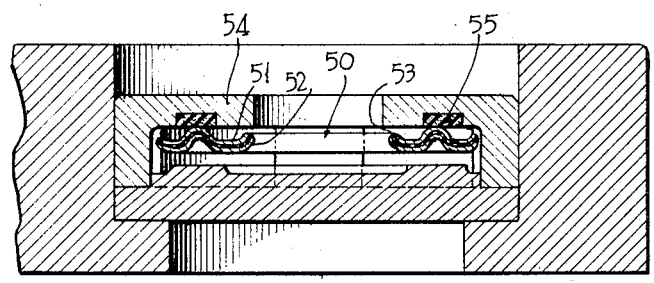
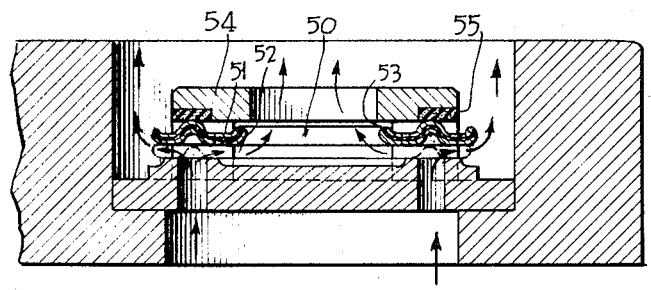
INVENTOR.
Raymond H. Blackford.
BY
Paul & Paul
ATTORNEYS United States Patent Office 3,409,038
Patented Nov. 5, 1968

3,409,038
LAMINATED MAGNETIC RUBBER VALVE
Raymond H. Blackford, Hartsdale, N.Y., assignor to
Durable Manufacturing Company, New York, N.Y., a
corporation of New York
Filed Apr. 26, 1966, Ser. No. 545,314
10 Claims. (Cl. 137—516.15)

ABSTRACT OF THE DISCLOSURE

A reciprocating valve structure which slides on a guide stem and is composed of several layers; at least one layer being composed of magnetic rubber which cooperates with magnetic means in the valve housing to repel the valve member onto its seat.

This invention relates to a valve structure, particularly to a structure including a reciprocating valve member which is composed of several layers, at least one layer being composed of magnetic rubber.

Valves of various purposes, which have met with substantial success commercially, are shown in my prior Patents Nos. 2,710,023, 2,727,531 and 2,754,844. Each of those patents shows a reciprocating valve disc provided with a spring between the disc and the guard. The spring has many purposes, one of which is to cushion the opening movement of the disc as the disc approaches the stop on the guard. Another function of the spring is to return the disc to its seat to perform the closing operation of the valve. It will be appreciated, of course, that in each of these cases the opening movement of the valve disc is actuated by fluid pressure.

An object of this invention is to provide a valve which has better opening and closing characteristics than those of the valves disclosed in my aforementioned prior patents.

Another object is to provide a valve structure having a longer useful life than existing valves, particularly to provide a structure which allows a longer life for the valve disc. In the valves of the prior art, when the valve is life-tested to failure, failure often occurs in the disc as a result of large numbers of repeated concussions between the disc and the guard on the one hand and the disc and the seat on the other.

It is a particularly important advantage of this invention that it provides a valve having an optimum loading curve as compared to the conventional spring valve, wherein the maximum load builds up fast at the end of the actuating stroke, yet is at a very minimum at the start and througout most of the stroke.

Another object of this invention is to provide a valve which functions better than those of the prior art but which has a lower overall height, one advantage of which is to allow the pump or compressor to be designed with a reduction in "reexpansive" area. Other objects and advantages of this invention will further become apparent hereinafter and in the drawings of which:

FIG. 1 represents a view in perspective, with a portion cut away, showing a typical valve constructed in accordance with this invenntion and embodiyng the magnetic features referred to;

FIG. 3 is a view in plan showing a compressor type valve of the general type disclosed in my prior Patent No. 2,754,844;

FIG. 4 represents a sectional view taken as indicated by the lines and arrows IV—IV in FIG. 3, this figure showing a particular form of the magnetic features of this invention as applied to that valve;

FIG. 5 is an exploded view in perspective, with portions broken away and shown in section, of the valve appearing in FIGS. 3 and 4;

FIG. 6 is a plan view of a check valve of the type appearing in my prior Patent No. 2,727,531;

FIG. 7 is a view in perspective showing the valve guard and guiding member of the valve shown in FIG. 6;

FIG. 8 is a side sectional view showing the structure of FIGS. 6 and 7, including the magnetic features of this invention, the valve being shown in an open position, taken as indicated by the lines and arrows VIII—VIII which appear in FIG. 6;

FIG. 9 is a view similar to FIG. 8, taken as indicated by the lines and arrows IX—IX which appear in FIG. 6.

Figure 1:
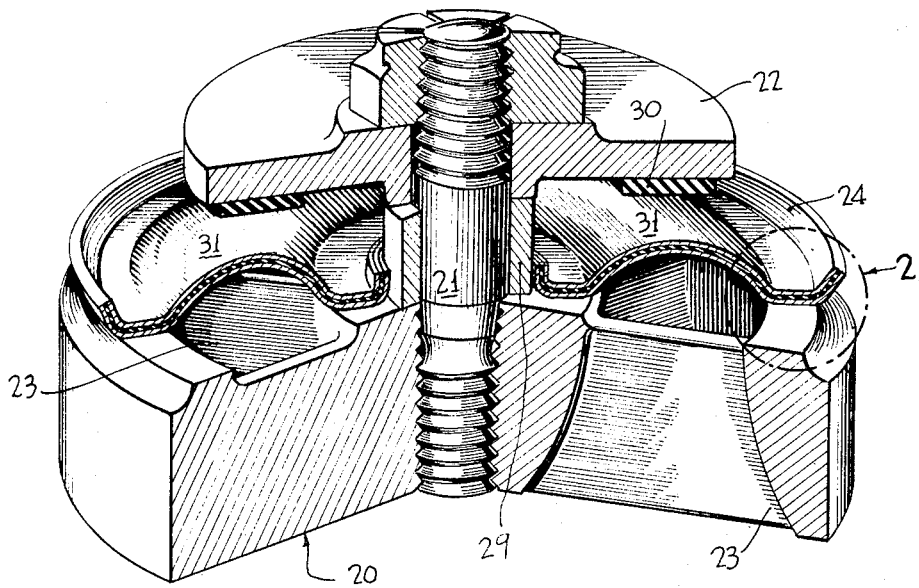

Although specific terms will be used in the description which follows, it is to be appreciated that these are not intended to limit the scope of the invention, but are used for the sake of clarity in describing the specific forms of the invention selected for illustration in the drawings.

Figure 2:
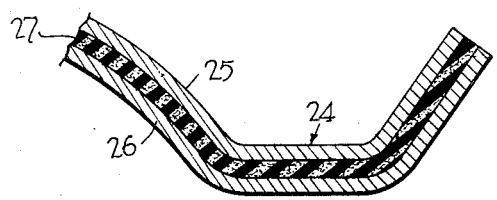
FIG. 2 is a fragmentary enlarged sectional view of the valve disc appearing in FIG. 1.

Turning to FIGS. 1 and 2, the valve comprises a seat member 20 having a stud 21 in threaded relation, and a guard 22 is provided in fixed position, threaded to the stud 21, and spaced above the seat 20. The seat 20 is provided with ports 23 for the fluid. A valve disc 24 is fitted loosely around a collar 29 which surrounds the stud 21 for reciprocating movement back and forth between the seat 20 and the guard 22.

The valve disc 24 has an upper metal layer 25 and a lower metal layer 26 together with an intervening layer 27 composed of magnetic rubber.

Magnetic rubber suitable for use in accordance with this invention may be manufactured in a variety of ways, and is a staple article of commerce known per se in the rubber art. In one form, the rubber is molded in such a manner as to contain large numbers of extremely finely divided magnetic barium ferrite particles. Notwithstanding its magnetic characteristic, magnetic rubber retains the characteristics of rubber and is readily deformable and returns elastically and repeatedly to its original shape.

Mounted on the under side of guard 22 is a magnetic ring 30 of opposite magnetic polarity to the magnetic rubber layer 27, and arranged in the path of reciprocation of the arched portion 31 of valve disc 24.

It will be appreciated that if desired the valve stem 21 may be composed of magnetic metal having a polarity opposed to that of the magnetic rubber layer 27. Since in that case the stud 21 opposes the disc all around its edges, keeping the disc centered and minimizing the edge wear of the disc, the collar 29 may be dispensed with. On the other hand, collar 29 may instead be composed of magnetic metal.

It will be appreciated that, when the disc 24 reciprocates, its lowermost position places the disc against the seat 20 thus preventing flow of fluid through the ports 23, and the upper position of disc 24 places the arched portion 31 in contact with the ring 30, with the magnetic layer 27 spaced slightly away from the ring 30 by the metal layer 25.

Figure 10:
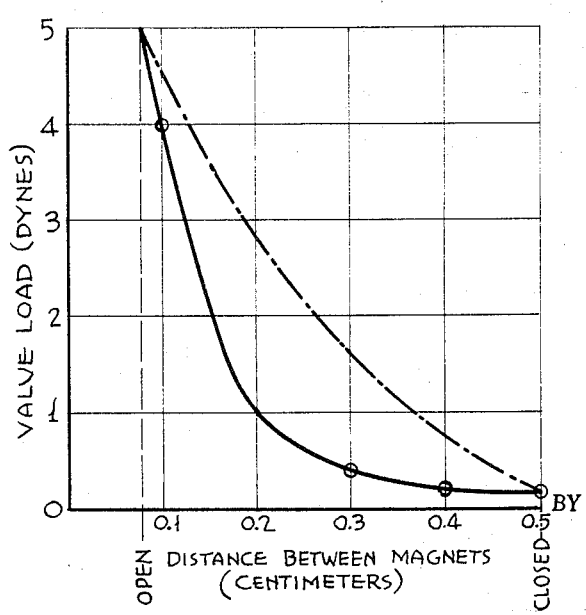
FIG. 10 is a chart illustrating the loading characteristics of valves constructed in accordance with this invention, compared to the loading characteristics of valves of the prior art.

It has been found that the magnetic valve construction as described herein has particular advantage in terms of loading characteristics. Referring to FIG. 10, the solid line shows the operating characteristics of a valve according to FIGS. 1 and 2, while the dot-dash lines shows the load versus distance curve for a similar valve using instead a helical spring between the disc and the guard. It will be noted, referring to the solid line in FIG. 10, that as the valve moves from its closed position toward its open position (toward the left in FIG. 10) a slight increase of valve load (the force exerted upon the valve by the fluid) causes a substantial valve movement. In fact, the great majority of the valve movement is accomplished by only a small fraction of the ultimate valve load. The last tenth of a centimeter of valve movement is achieved only by greatly increasing the valve load. By way of contrast, in the spring type valve, unless a costly multi-form spring design is used, the displacement of the valve disc is more nearly proportional to the valve load. The surprising characteristics achieved in accordance with this invention and as shown in FIG. 10 are highly advantageous in the valve art.

Turning now to FIG. 3 of the drawings, reference may be had to my prior Patent No. 2,754,844 for a full identification of many conventional parts, but it will be observed that the valve disc 40 is composed of three layers: outer layers 41 and 42 of metal or plastic, for example, and an intermediate layer 43 composed of magnetic rubber. Similarly, a strip of magnetic metal 44 is applied to the valve guard 45, and has a magnetic polarity which is opposed to that of the magnetic rubber layer 43.

The guiding member 46 may, if desired, be composed also of magnetic metal which has a polarity opposed to that of the magnetic rubber layer 43. Thus, the cylindrical member 46 constantly repels the valve disc, keeping it centered and minimizing edge wear of the valve disc.

Turning to FIGS. 6–9 of the drawings, reference may be had to my prior Patent No. 2,727,531 for the structural details of most of the components of the valve. However, it will be observed that the valve ring 50 appearing in FIGS. 8 and 9 is composed of outer metal layers 51 and 52 together with a central layer of magnetic rubber 53. The valve guard 54 is provided with a magnetic ring 55 above the arched configuration of the valve ring 50. It will be appreciated that the leg members 57 which serve as guides for the ring may be composed of magnetic material having a polarity opposed to that of the magnetic rubber layer 53, and that this magnetically repels the ring all the way around its periphery, keeping it centered and minimizing edge wear of the valve ring.

It will be appreciated that a valve constructed in ac- that this invention may be used in this equipment as a substitute for the conventional spring. The invention can operate efficiently whether the valve unit is composed of metal, plastic, rubber or any other materials, or combination thereof. Conventional metal magnets can be used but it is important to provide yieldable rubber in the valve disc or guard, or seat, or any combination thereof, because the yieldable nature of the rubber coacts with the load curve characteristic appearing in FIG. 10 to provide unexpectedly long valve life.

Although specific configurations have been shown for the magnets of the valve guard and other parts, it will be appreciated that these magnets can either be affixed to the valve unit parts or the magnetic materials themselves can be fashioned into the parts, using an appropriate material. Ceramic magnets are advantageous, for their temperature resistance. They also provide a wide range of component parts from which to choose, depending on the service requirements.

It will also be understood that, in a valve having a stud, the stud itself may be a magnet or may be non-magnetic but provided with a magnetic material in any suitable manner.

It will also be appreciated that the valve member can be repulsed in a manner to urge it to its seat, or it can also be attracted to its seat by a magnetic member. Indeed, a combination of both repulsion and attraction can be used at the same time to allow a wide variation in the strength of the required loading.

As is shown in my prior Patent No. 2,710,023, special springs have been designed which have gradually decreasing radius. One purpose of these springs is to provide an increased resistance to movement as the valve approaches the guard, in order to avoid slamming. Such special springs are made at great expense and are better than ordinary helical springs. However, the drastic anti-slamming effect achieved by the magnetic structure in accordance with this invention, and as illustrated in FIG. 10, coacts with the cushioned nature of the magnetic sandwich to provide vastly improved valve performance and endurance.

Any number of alternate layers of magnetic rubber may be provided in the valve, and they may in many cases be applied as the outer layers which contact the guard and the stud. For example, in FIG. 2, the layers 25 and 26 may consist of magnetic rubber and the layer 27 metal, plastic or the like.

Although this invention has been disclosed with reference to specific forms thereof, it will be appreciated that various modifications may be made, including the substitution of equivalent elements, the use of certain features independently of other features, and reversals of parts, all without departing from the spirit and scope of this invention as defined in the appended claims.

It is claimed:

1. A valve unit comprising means forming a valve seat, a valve stop spaced apart from said seat, and a valve member reciprocable between said seat and said stop, said valve member consisting of multiple alternate layers including a layer of magnetic rubber, and magnetic means on said valve unit at a location remote from said seat carrying a magnetic charge continuously repelling said valve member toward said valve seat.

2. The valve unit defined in claim 1 wherein said magnetic means is carried on said stop.

3. The valve unit defined in claim 1 wherein a guide means extends adjacent the valve member along its reciprocating path, said guide means being spaced closely from said valve member and having a magnetic charge repulsive to said valve member.

4. The valve unit defined in claim 3 wherein the valve has an open center and said guide means extends through said open center.

5. The valve unit defined in claim 3 wherein the valve has the form of a ring and the guide means comprises a plurality of legs outside said ring, said legs being curved corresponding to the curvature of said ring.

6. The valve unit defined in claim 3 wherein the valve is a disc and the guide means comprises a cylinder outside said disc.

7. The valve unit defined in claim 1 wherein the multiple alternate layers include an inner layer of magnetic rubber.

8. The valve unit defined in claim 1 wherein the multiple alternate layers include an inner layer of metal and an outer layer of magnetic rubber.

9. The valve unit defined in claim 1 wherein a stud is secured to said valve seat and to said stop and extends through said valve member, and wherein said stud carries a magnetic charge that is repulsive to said valve member.

10. The valve unit defined in claim 1 wherein a stud is secured to said valve seat and to said stop and extends through said valve member, and a collar is disposed intermediate said stud and said valve member, and said collar carries a magnetic charge that is repulsive to said valve member.

References Cited

UNITED STATES PATENTS

| 2,649,277 | 8/1953 | Blackford | 137—543.19 XR |
| 2,710,023 | 6/1955 | Blackford | 137—515.5 XR |
| 2,754,844 | 7/1956 | Blackford | 137—543.19 XR |
| 2,959,832 | 11/1960 | Baermann. | |
| 3,203,447 | 8/1965 | Bremner | 251—65 |

FOREIGN PATENTS 744,858   7/1954   Great Britain.

WILLIAM F. O'DEA, *Primary Examiner.*

W. H. WRIGHT, *Assistant Examiner.*

Washington, D.C. 20231

UNITED STATES PATENT OFFICE
CERTIFICATE OF CORRECTION

Patent No. 3,409,038                                November 5, 1968

Raymond H. Blackford

It is certified that error appears in the above identified patent and that said Letters Patent are hereby corrected as shown below:

In the heading to the printed specification, line 4, "Durable" should read -- Durabla --.

Signed and sealed this 3rd day of March 1970.

(SEAL)
Attest:

Edward M. Fletcher, Jr.                         WILLIAM E. SCHUYLER, JR.

Attesting Officer                                       Commissioner of Patents